Feb. 21, 1967

E. E. EDMONDS 3,304,668

COLLAPSIBLE CABIN

Filed June 24, 1964

INVENTOR.
EARL E. EDMONDS
BY
Van Valkenburgh and Fields

ATTORNEYS

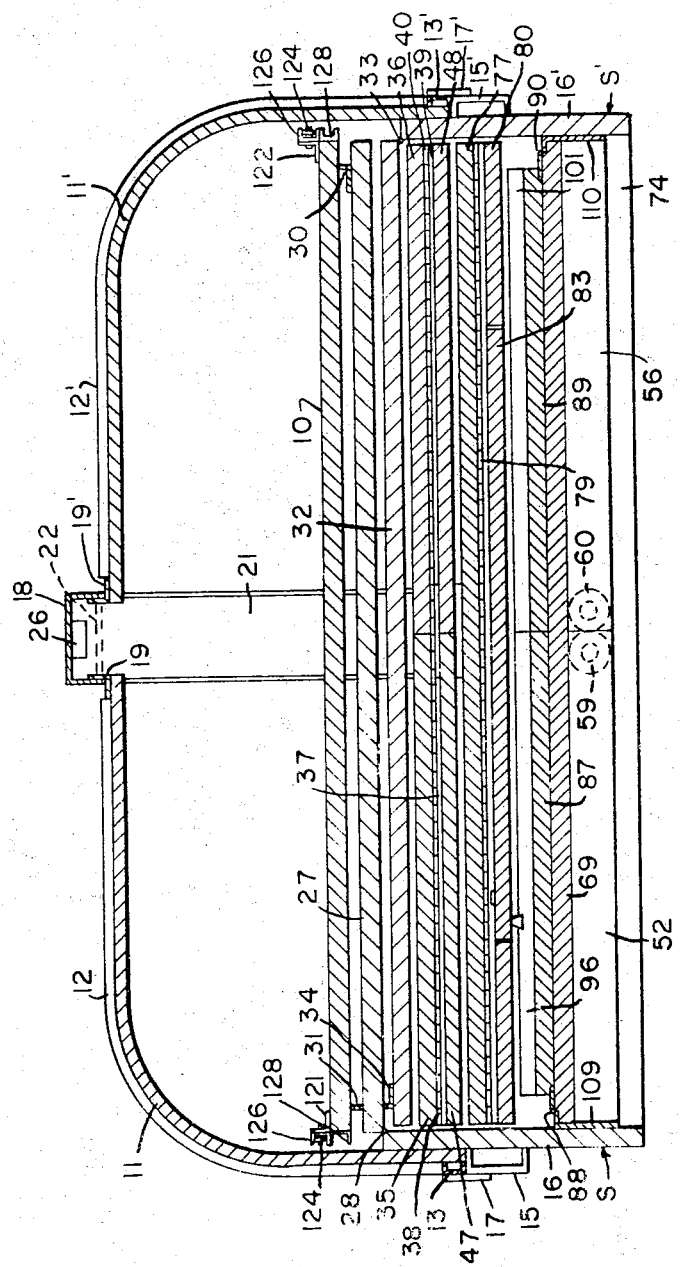

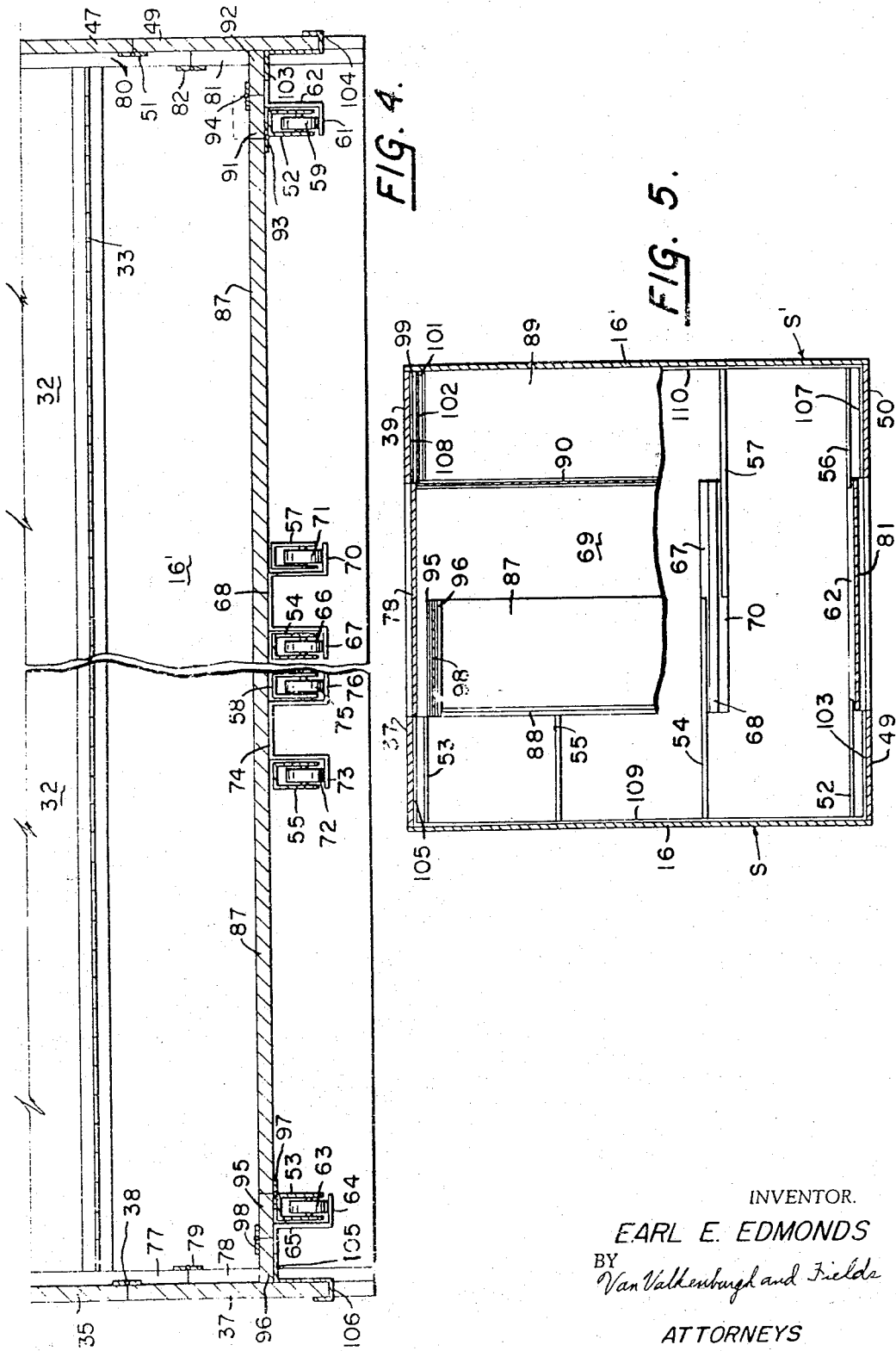

Feb. 21, 1967 E. E. EDMONDS 3,304,668
COLLAPSIBLE CABIN
Filed June 24, 1964 5 Sheets-Sheet 4
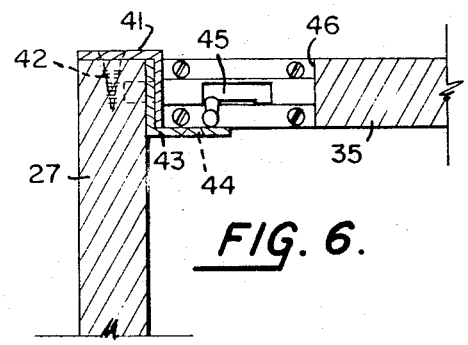
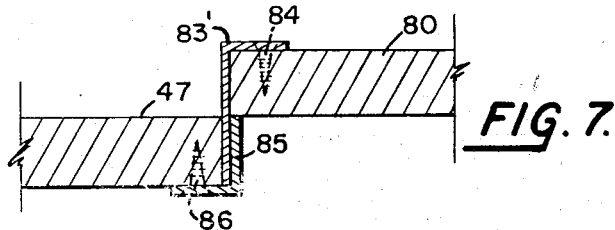
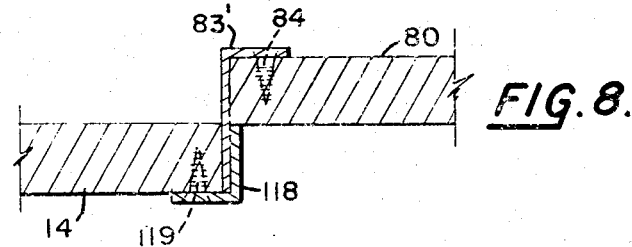
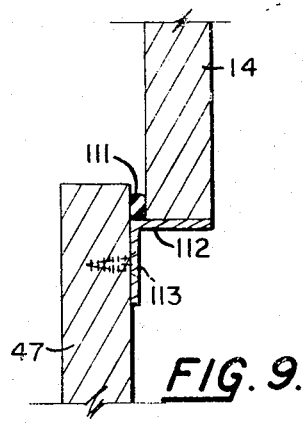
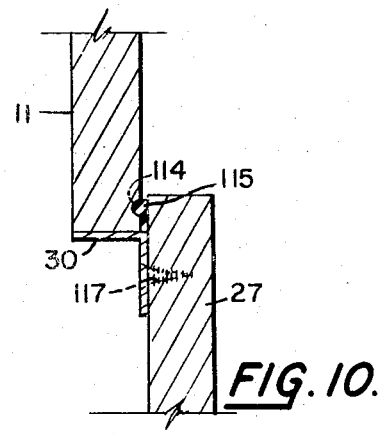
INVENTOR.
EARL E. EDMONDS
BY
Van Valkenburgh and Fields
ATTORNEYS Feb. 21, 1967  E. E. EDMONDS  3,304,668
COLLAPSIBLE CABIN Filed June 24, 1964  5 Sheets-Sheet INVENTOR.
EARL E. EDMONDS
BY
Van Valkenburgh and Fields
ATTORNEYS

United States Patent Office

3,304,668
Patented Feb. 21, 1967

1

3,304,668
COLLAPSIBLE CABIN
Earl E. Edmonds, 8495 Grandview Ave.,
Arvada, Colo. 80002
Filed June 24, 1964, Ser. No. 377,635
13 Claims. (Cl. 52—67)

This invention relates to a cabin, and more particularly to a collapsible cabin.

Various prior attempts have been made to make a collapsible cabin, but each of these has had certain inherent disadvantages. In many instances, the cabin was not collapsible in height, but only in length and/or width, making it necessary to mount it on a trailer which must be pulled behind an automobile or other vehicles. Such an arrangement adds to the expense of the cabin, as well as decreasing the enjoyment of the vacationers who must pull a trailer behind them. Also, previous cabins have been awkward and required two or more people to set them up. Thus, there has arisen a need for a cabin which can be collapsed not only to reduce it in width, but to reduce it also in height, so that it may be easily transported, such as on the bed of a pickup truck or similar vehicle or other feasible means of transportation.

Among the objects of this invention are to provide a collapsible cabin; to provide a collapsible cabin which will double its floor area when opened; to provide such a cabin which is collapsible in height, as well as in width; to provide such a collapsible cabin which is adapted to fit on or above the bed of a pickup truck or similar vehicle; to provide such a collapsible cabin in which all parts of the cabin fit within the center section when the cabin is collapsed; to provide such a collapsible cabin in which the side sections are roller mounted for easy movement to the open position; to provide such a collapsible cabin in which the wall sections are hinged at different heights for folding, so that each section folds flat; to provide such a collapsible cabin which is substantially enclosed by the side roof panels when collapsed; to provide such a collapsible cabin which may be locked when in collapsed position, so that it is tamper-proof; to provide such a collapsible cabin in which the center roof panel locks the wall sections and roof sections together when the casin is assembled; to provide such a collapsible cabin in which the center roof panel is provided with rollers which ride on rails on the side roof panels to facilitate assembly; to provide such a collapsible cabin in which the center roof panel rollers trigger the locking of the center roof panel to the side roof panels and the wall sections when assembled; to provide such a collapsible cabin in which the rollers are foldable, so as not to extend beyond the end of the center roof panel when the cabin is collapsed; to provide such a collapsible cabin which may be assembled and disassembled by one person; to provide such a collapsible cabin which is relatively light in weight; to provide such a collapsible cabin which is relatively simple in construction, yet highly efficient in operation; and to provide such a collapsible cabin which is economical to manufacture.

Additional objects and novel features of this invention will become apparent from the description which follows, taken in conjunction with the accompanying drawings, in which.

2

Figure 2:
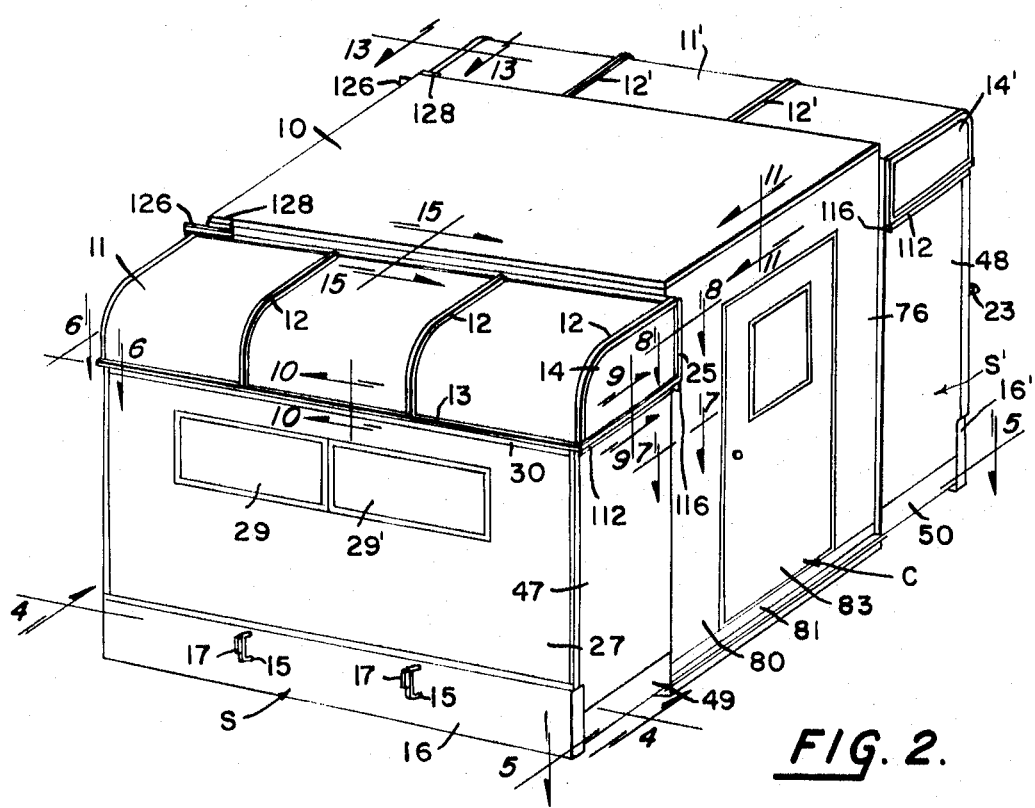
FIG. 2 is a side perspective view of the collapsible cabin of FIG. 1 in open position.
Figure 11:
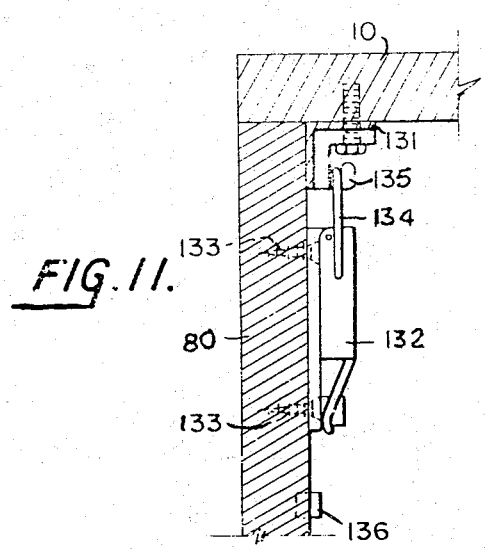
Figure 12:
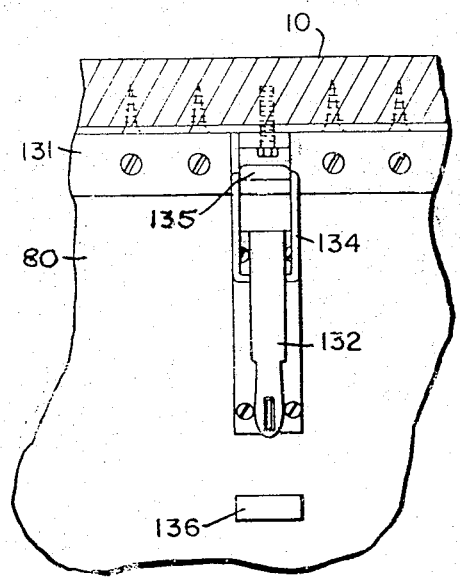
Figure 13:
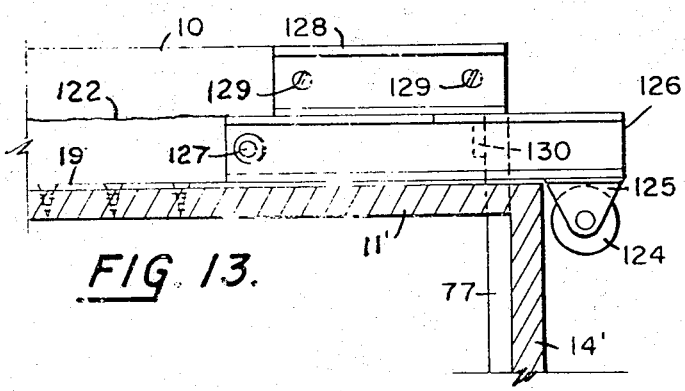
Figure 14:
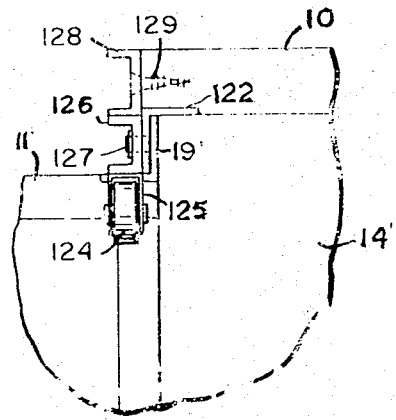
Figure 15:
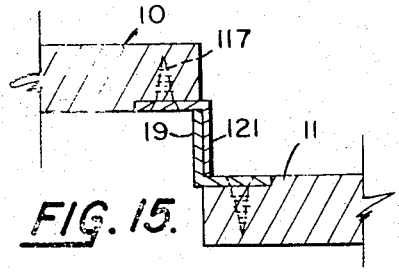

FIG. 3 is an enlarged, horizontal section, taken along line 3—3 of FIG. 2, showing the position of the panels within the side roof sections when the cabin is collapsed;

FIG. 4 is an enlarged, condensed, fragmentary, longitudinal section taken along line 4—4 of FIG. 2, showing the roller arrangement and floor construction;

FIG. 5 is a fragmentary, horizontal section through the bottom of the cabin, along line 5—5 of FIG. 2, showing the floor and track construction;

FIG. 6 is an enlarged, fragmentary, vertical section taken along line 6—6 of FIG. 2, showing the engagement of the side wall and rear wall sections;

FIG. 7 is an enlarged, fragmentary, horizontal section, taken along line 7—7 of FIG. 2, showing the engagement of the front wall sections;

FIG. 8 is an enlarged, fragmentary, horizontal section, taken along line 8—8 of FIG. 2, showing the engagement of a front wall section and a side roof section;

FIG. 9 is an enlarged, fragmentary, vertical section, taken along line 9—9 of FIG. 2, showing the engagement of the end of a top side wall and a front side wall;

FIG. 10 is an enlarged, fragmentary, vertical section, taken along line 10—10 of FIG. 2, showing the engagement between a side wall and a side roof panel;

FIG. 11 is an enlarged, fragmentary, vertical section, taken along line 11—11 of FIG. 2, showing the engagement of the center roof panel and front wall section, with the latch therefor;

FIG. 12 is a fragmentary, front elevation, showing the latch of FIG. 11;

FIG. 13 is an enlarged, fragmentary, horizontal section, taken along line 13—13 of FIG. 2, showing the roller construction for the center roof panel;

FIG. 14 is a fragmentary end elevation of the cabin showing the roller of FIG. 13; and FIG. 15 is an enlarged, fragmentary, horizontal section, taken along line 15—15 of FIG. 2, showing the engagement between the center roof panel and a side roof panel.

Figure 1:
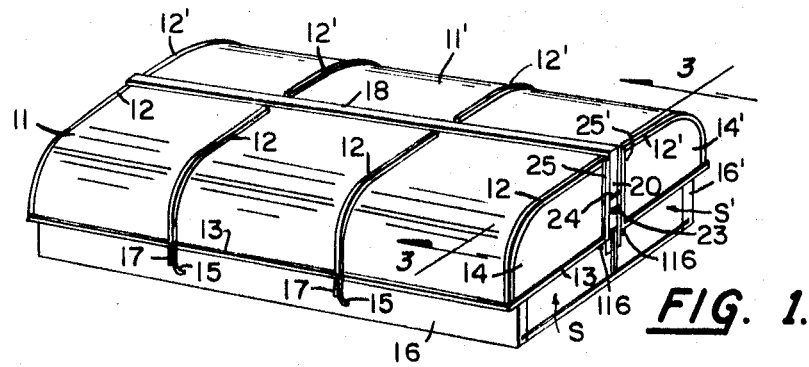
FIG. 1 is a side perspective view of the collapsible cabin of this invention in collapsed storage position.

In accordance with this invention, a collapsible cabin is provided which may be collapsed to the position of FIG. 1 for storage and/or transportation and may be opened to the position of FIG. 2 for use. The cabin comprises three main components, a center section C, which, for example, may be four feet wide, and two extensible side sections S and S' which, for example, may be each two feet wide and completely cover center section C when in the collapsed position of FIG. 1. In addition, the cabin includes a center roof panel 10 and a pair of curved side roof panels 11 and 11', the side roof panels providing a cover for the cabin when collapsed. Conveniently, side roof panel 11 is reinforced by transverse ribs 12 spaced longitudinally of the roof panel and a peripheral frame member 13, extending along the sides and end panels 14, while roof panel 11' is provided with similar ribs 12' spaced longitudinally therealong and a peripheral frame member 13' extending along the sides and end panels 14' thereof. Advantageously, side roof panel 11 is supported, when the cabin is in the closed position, by a pair of spaced brackets 15 as seen in FIGS. 1 and 3, attached to the lower left side wall 16, while side roof panel 11' is supported by a pair of spaced brackets 15' attached to the lower right side wall 16'. The roof panels 11 and 11' are held in place, as by latches 17 and 17', on brackets 15 and 15', respectively, and are locked together at the center by a channel 18 running longitudinally of the cabin, whose depending flanges engage the upwardly extending flanges of angles 19 and 19', as in FIG. 3, to prevent the roof panels from the moving apart or sliding off brackets 15 and 15'. A depending arm 20 is pivoted to the forward end of channel 18, while a similar arm 21 is pivoted to the rear end of the channel, as by the pivot pin 22, shown in FIG. 3. Arm 20 is provided with a slot through which an ear 23, attached to the right upper side wall, as in FIG. 2, extends, so that a padlock may be extended therethrough to prevent anyone from opening the cabin or molesting it in any way. Similarly, arm 21 may be provided with a slot for receiving an ear connected to the rear edge of the upper right side wall. If desired, a bolt, such as bolt 24 of FIG. 1, may be extended through holes in vertical frame members 25 and 25', to assure that the roof panels do not separate, while a similar bolt may be provided at the rear of the cabin.

To open the cabin, channel 18 is removed from side roof panels 11 and 11' and arms 20 and 21 are conveniently folded against the bottom of channel 18 and held in place by magnets, such as magnet 26, shown in FIG. 3, which is located near the rear end of the channel, it being understood that a similar magnet may be located near the front end of the channel to hold arm 20 in place. Next, the roof panels 11 and 11' are lifted off the center cabin section C and laid aside for the time being. Then, the center roof panel 10 is lifted out and also laid aside. The next step is to raise left upper side wall 27 which is attached to lower left side wall 16 by a hinge 28, the side wall being pivoted about the hinge until it is in a vertical position. Conveniently, side wall 27 may be provided with a pair of windows 29 and 29', as in FIG. 2. An angle 30, attached adjacent the upper end of upper left side wall 27, supports side roof panel 11, as will be described below, when the cabin is assembled, and also serves as a support for the center roof panel 10 when the cabin is in a collapsed position of FIG. 3. Conveniently, a stop 31 may be attached adjacent the lower end of upper left side wall 27 for supporting the opposite side of center roof panel 10 in a generally horizontal position when the cabin is collapsed.

Next, the upper right side wall 32, which is attached to the lower right side wall 16' by a hinge 33, is pivoted to the vertical position. This upper side wall may also have a pair of windows (not shown) and has an angle 34 adjacent its upper end for supporting the edge of side roof panel 11', as described below. It will be noted that hinge 33 is located below hinge 28 a distance at least equal to the thickness of side wall 32, so that the upper side walls will lie in a horizontal position when folded, with upper left side wall 27 supported by upper right side wall 32. The next step is to raise the left rear side wall 35 and right rear side wall 36. Left rear side wall 35 is hinged to a lower left rear side wall 37 by hinge 38, as in FIGS. 3 and 4, while right rear side wall 36 is hinged to a lower right rear side wall 39 by hinge 40, as in FIG. 3.

When in the raised position, the left rear side wall 35 may be connected to left side wall 27 and right rear side wall 36 may be connected to the right side wall 32. As can be seen in FIG. 6, upper left side wall 27 has one flange of an angle 41 attached to the end thereof, as by screws 42, while the other flange extends inwardly and is spaced from the inside edge of the side wall. Similarly, an angle 43 is attached to side rear wall 35, as by screws 44, and has an outwardly extending flange spaced from the edge of the panel, so that the flange of angle 43 is received between the inside edge of side wall 27 and the inwardly extending flange of angle 41, while the inwardly extending flange of angle 41 is received between the edge of side rear wall 35 and the outwardly extending flange of angle 43. These angles are locked together by means of a drawbolt 45 mounted in a notch 46 at the top of rear side wall 35 and extending through a pair of holes in their respective overlapping flanges, as shown.

Similarly, the right rear side panel 36 may be provided with a similar drawbolt which locks the panel 36 to the right upper side panel 32.

The next step is to raise upper left front side panel 47 and upper right front side panels 48 which are pivoted to lower left side panel 49 and lower right side panel 50, respectively. Conveniently, upper left side panel 47 is connected to lower left side panel 49 by piano hinge 51, while upper right side panel 48 is pivoted to lower right side panel 50 by another piano hinge (not shown). It can be noted in FIG. 4 that hinge 51 is spaced below hinge 38 at the rear of the cabin a distance equal to the thickness of the front side walls so that they lie flat, as in FIG. 3, when in the folded position. The front side panels are connected respectively with the upper left side panel 27 and upper right side panel 32 by interlocking angles and drawbolts, similar to those in FIG. 6. Thus, at this point, the side sections S and S' are completely assembled, and are now ready to be slid outwardly to the left and right, respectively, so that the center section C may be assembled.

As best seen in FIG. 5, lower left side wall 16 is attached to outer channels 52 and 53, respectively, as well as to center channels 54 and 55, while right lower side wall 16' is connected to the end of an outer channel 56 at the front of the cabin, as in FIG. 5, and a similar outer channel at the rear of the cabin (not shown). Also a pair of inner channels, such as inner channels 57 and 58, of FIG. 4, are connected to lower side wall 16'. Advantageously, the inner ends of front channels 52 and 56 are provided with rollers 59 and 60, as in FIG. 3, which are adapted to ride along a track formed by the outer flange 61 of a Z-shaped angle 62 which conveniently is attached to the bottom of the center floor panel, at the forward end thereof. Similarly, outer channel 53 is provided with a roller 63 at its inner end which is adapted to ride along a track formed by the inturned flange 64 of Z-shaped angle 65 which also is attached to the other end of the center floor panel. Conveniently, when the cabin is in the collapsed position, channels 52 and 56 abut at the center, as shown in FIG. 3. The same will be true of channel 53 and the corresponding channel of section S'. The center channels are considerably longer than the outer channels, thus, channel 54 is provided with a roller 66 at the inner end thereof which rides on a track formed by the outer flange 67 of a U-shaped supporting channel 68 attached to the bottom of the center floor panel 69 of FIG. 5, and having another outwardly extending flange 70 to form a track on which roller 71 of channel 57 rides. It will be apparent from looking at FIG. 5 when the side sections S and S' are in closed positions, channels 54 and 57 will overlap, one riding on flange 67 and the other on flange 70 of channel 68. Similarly, channel 55 is provided with a roller 72 which rides on a track formed by a flange 73 of a U-shaped channel 74 attached to the center floor section 69, while a roller 75 of channel 58 rides on a track formed by the other flange 76 of channel 72, channels 55 and 56 overlapping in the closed position.

After the side sections are pulled outwardly, the side roof panels 11 and 11' are attached. These roof sections are set in place, as shown in FIG. 2, the lower edge thereof resting on flanges of angles attached to the side, front and rear walls. The lower edge of front panel 14 of roof section 11 is provided with a weatherstrip 111, attached thereto, as by cementing, which engages the outside edge of front side wall 47, the lower end of the panel resting on the outwardly extending flange of an angle 112 attached to the side wall, as by screws 113. Similarly, the side edge of roof panel 11 is provided with a recess 114 receiving a weatherstrip 115 which has a depending lip and abuts the outside of side wall 27, the lower end of the roof panel resting on angle 30 which is held in place as by screws 117. Thus, a tight weather seal is provided all around the roof to assure a weather tight fit. Each side panel is provided with a depending clip 116 at the lower edge thereof, as in FIG. 2, which engages the side edge of angle 112 so that the side panels cannot slide off of angles 30 during assembly of the rest of the cabin, but locks the side roof panels securely in place.

Then, the upper rear center wall 77, which is pivoted to the lower rear center wall 78 by a piano hinge 79, is pivoted upwardly and attached to upper rear side walls, while an upper front center wall 80, which is pivoted to the lower front center wall 81 by a hinge 82, is pivoted upwardly into the position of FIG. 1 and attached to the upper front side walls 47 and 48, as shown in FIG. 7, front center wall 80 having a door 83 therein for entrance into the cabin. Conveniently, the door opening extends clear down to the lower center panel 81. As seen in FIG. 4, hinge 82 is located below hinge 79 a distance equal to the thickness of front center wall 80, so that the walls lie flat when folded. Also, by having upper front center wall 80 the last to be raised up, the lower front center panel 81 may be very short, so that it will provide a minimum of inconvenience to those entering the cabin, since they must step over it.

As seen in FIG. 7, an angle 83' is attached to the edge of center panel 80, as by screws 84, and has an outwardly extending flange. Upper left front side panel 47 is provided with an angle 85 attached thereto, as by screws 86, and has an inwardly extending flange spaced from the edge thereof which abuts the face of panel 80, while the outwardly extending flange of angle 83' is received in the space between the inwardly extending flange of angle 85 and the edge of panel 47, as shown. Thus, a tight seal is assured between the panels. Of course, it will be understood that suitable rubber seals may be provided at each of the interlocking edges of the cabin so that it will be weathertight, if and as desired.

Center front wall 80 is taller than the front side walls 47 and 48, as seen in FIG. 2, so that the upper portion of the side edge thereof interlocks with the edges of end panels 14 and 14' of the respective side roof sections 11 and 11'. Thus, as seen in FIG. 8, the front roof panel 14 has an angle 118 attached thereto, as by screws 119 and having an inwardly extending flange spaced from the end of the panel. Thus, the outwardly extending flange of angle 83' is received in the space between the end of panel 14 and the inwardly extending flange 118, while the inwardly extending end of angle 118 abuts the face of panel 80.

Next, the floor is opened. The floor comprises center floor panel 69, as best seen in FIGS. 4 and 5, to which left side panel 87 is attached by a hinge 88 and a right side panel 89 attached by a hinge 90. These side floor panels are folded on top of center floor panel 69, as shown in FIG. 3, when in storage position, but can be folded outwardly, as best seen in FIG. 5, to form a floor for side sections S and S' after they have been pulled out and assembled, as described above. It will be noted that side sections S and S' are longer than the center section C, so that the end walls thereof may fit over the end walls of the center section when in closed position, which makes it necessary to provide the side floor panels with foldable end flaps to take up the gap between the ends of the side floor sections and the lower side end walls, since the side floor panels can be no longer than the center floor panel when in folded position. As can be seen in FIGS. 4 and 5, left floor panel 87 is provided with a pair of flaps 91 and 92 at the forward end thereof, inner flap 91 being attached to the bottom of the floor panel by a hinge 93, while flap 92 is attached to the top forward edge of flap 91 by a hinge 94. Similarly, the rear end of left floor panel 87 is provided with a pair of flaps 95 and 96, flap 95 being attached to the bottom edge of left floor panel 87 by a hinge 98. Similarly, right side floor panel may be provided with flaps, such as rear flaps 99 and 101, flap 99 being attached to floor panel 89 by a hinge and flap 101 being attached to flap 99 by hinge 102. In the closed position, both side floor panels are folded on top of the center floor panel, as shown in FIG. 3, with the flaps folded back, as panel 87 is shown in FIG. 5. To open floor panel 87, it is pivoted to a generally vertical position, at which point flap 92 is pivoted about hinge 94, so that it lies on flap 91 and flap 96 is folded so that it lies on flap 95. Then both flaps 91 and 92 are pivoted about hinge 93 so that flap 91 lies in the same plane as the floor panel 87 with flap 92 thereabove, as shown in dotted lines in FIG. 4, while flaps 95 and 96 are pivoted together about hinge 97, so that flap 95 is in the same plane as panel 87 with flap 96 thereabove. Then, the floor panel is dropped into position and flaps 92 and 96 are pivoted respectively, to the positions shown in FIG. 4. Advantageously, flap 92 rests against flange 103 of channel 104 which fits over the bottom edge of lower side end wall 49, while flap 96 rests against flange 105 of a channel 106 which fits over the bottom of lower rear side panel 37. Similarly, outer flaps of floor panel 89 will rest on flanges 107 and 108 of similar channels, as shown in FIG. 5. Conveniently, the longitudinal side edges of floor panels 87 and 89 are supported by the inwardly extending flange of angles 109 and 110, respectively, attached to lower side walls 16 and 16'. When the cabin is closed, these flanges rest in notches along the edges of center floor panel 69, as in FIG. 3.

Finally, the center roof panel 10 is put in place. As best seen in FIGS. 14 and 15, the roof panel 10 is provided with a pair of angles 121 and 122 attached to the underside, as by screws 117, and having downwardly depending flanges which are adapted to engage the outer edges of upwardly extending flanges 19 and 19' of side roof sections 11 and 11', respectively. Thus, the center roof panel 10 is slid onto the cabin from the front with channels 19 and 19' acting as guides for the roof panel, and to provide a seal between the roof panels. Of course, suitable weatherstripping may be provided, if desired or needed. To facilitate the sliding of the roof panel 10 in place, it is provided at the rear end with a pair of rollers 124, as in FIG. 3, but shown in more detail in FIGS. 13 and 14, which ride along the flanges of angles 19 and 19' as rails. Roller 124 is mounted in a sheave 125 attached to the bottom flange of an outwardly extending flange of channel 126, which extends beyond the end of center roof section 10, as shown. The channel is pivotally attached at the inner end thereof to angle 122 by a pivot pin 127. In storage position, this roller mechanism is pivoted about pivot pin 127 so that it extends inwardly from the end of center roof panel 10, as in FIG. 3, so that roof panel 10 will fit within the confines of the cabin when in closed position. However, during use, the rollers must be pivoted to the position of FIGS. 13 and 14, so that they extend outwardly beyond the end of the roof panel 10 and abut a stop 128 which may take the form of a channel attached to the side of center roof panel 10, as by screws 129. The roof is also provided with a lateral angle 130, as shown in dotted lines in FIG. 13, which is adapted to abut the upper edge of rear upper center panel 77, while a similar angle 131 is provided adjacent the front edge of the center roof panel, whose depending flange is adapted to engage the upper inner edge of front center panel 80, as shown in FIGS. 11 and 12, when center roof panel 10 is in place. However, while the roof is being slid into place, rear angle 130 will be elevated because rollers 124 will be rolling on the outwardly extending flanges of the angles 19 and 19'. However, rollers 124 are so spaced from angle 130 that, when the rollers drop off the end of angles 19 and 19', angle 130 will drop behind rear panel 77 and angle 131 will drop into place behind front panel 80, which triggers the locking of the cabin, so that the front wall, back wall and side roof panels are locked in place.

The roof may be secured permanently by a plurality of toggle latches, such as toggle latch 132 of FIGS. 11 and 12, attached to front wall 80, as by screws 133, which has a hook ring 134 adapted to engage a hook 135 attached to angle 131. Similar hooks may be attached to angle 124 and a toggle lock may be provided along the rear edge of the cabin also. Conveniently, a magnet 136 is provided below toggle latch 132 for retaining the hook ring 134 when the toggle latch is disengaged, so that it does not flop around when the cabin is being folded.

Of course, to collapse the cabin, the procedure is just reversed. First, the toggle latches 132 are released and their keepers are brought into engagement with magnets 136 to hold them in place. Then, the center roof panel 10 is lifted upwardly at the front and slid forwardly, so that rollers 124 ride up on angles 19 and 19' as the center roof panel is slid off the cabin and laid aside. Next, the left and right side floor panels 87 and 89 are folded inwardly to the storage position, shown in FIG. 5, and this is accomplished by manipulating the respective flaps on the ends of the panels, so that the side floor panels will clear the front and back center walls 80 and 77, respectively. It will be understood that the outermost flaps 92 and 96 of left side floor panel 87 will first be folded back on top of the innermost flaps 91 and 95, respectively, and the panel raised to a generally vertical position. Then, flaps 95 and 96 are folded so that they lie flat against floor panel 87, as shown in FIG. 5, as are flaps 91 and 92, side panel 87 then being folded so as to rest on top of center panel 69, as in FIGS. 3 and 5. Right side panel 89 is folded in a similar manner, as in FIG. 3. After this is accomplished, the front center panel 80 is folded to a horizontal position, as in FIG. 3, resting on top of the flap of the folded side floor panels 87 and 88, as in FIG. 3. Next, the back center panel 77 is folded downwardly about hinge 76, so that it rests on the front panel 80. The side roof panels 11 and 11' are then lifted from the cabin. Next, the side sections S and S' are slid inwardly along their respective tracks, so that the front channels 52 and 56 abut in the center, as shown in FIG. 3, and the rear rails do the same. Of course, it will be understood that the longer center rails will cross on opposite sides of center channels 68 and 74, respectively. Next, the drawbolts 45 interconnecting the front side walls and the side walls are withdrawn and the upper front side walls 47 and 48 are folded down. Then, the rear drawbolts 45 are withdrawn and the corresponding side rear walls 35 and 36 are folded down on top of front side walls. Following this operation, side wall 32 is folded and then side wall 27 is folded. Finally, the channels 126, on which rollers 124 are mounted, are folded inwardly, as in FIG. 3, so as not to extend beyond the end of center roof panel 10. The center roof panel is then turned upside down and placed on top of the right side wall 27, being supported by angle 30 and stop 31. Next, the side roof panels 11 and 11' are placed in the position shown in FIGS. 1 and 3, being secured in place by channel 18 whose arms 19 and 21 extend over ears 23, so that the entire cabin may be locked by padlocks extending through the ears.

From the foregoing, it can be seen that the novel features and objects of this invention have been fulfilled to a marked degree. A cabin has been provided, which is collapsible for storage, but which will expand when in use in both width and height. Because it is only four feet wide when closed, it will easily fit onto or above the bed of a pickup truck or similar vehicle, but, of course, the cabin may be made to any suitable size desired. Conveniently, all of the parts of the cabin fit in the center section when closed and the center section is provided with side sections which are roller mounted for outward extension to expand the cabin, such as from a four foot to an eight foot width. Advantageously, the side and end walls are hinged at different heights for folding, so that they will lie in a generally horizontal position above each other over the center section when closed. The cabin is completely enclosed by the side roof panels 11 and 11' to protect it from the elements when closed and is made completely tamper-proof by a channel which extends along the meeting center edges of the side roof panels to hold them together. In addition, the center roof panel is provided with flanges which completely lock the cabin together when it is assembled. The center panel has rollers at one end which ride on rails on the edges of the side roof panels to facilitate assembly. Conveniently, the roller is so spaced from the rear depending flange of the center roof section that, as the rollers drop over the ends of the side roof panels, the rear flange drops behind the upper edge of the rear wall to lock it in place. At the same time, a front depending flange at the front of the center roof panel is allowed to drop behind the front center wall. Thus, the cabin is completely interlocked when the center roof panel is put in place, this locking being triggered by the rollers on the center roof panel. Due to its small size when collapsed, the cabin can easily be mounted on or above the bed of a pickup truck, as desired. It can be seen that the cabin is of relatively simple construction and can be easily assembled by one or two persons and may be manufactured relatively inexpensively.

Although a preferred form of this invention has been illustrated and described, it will be understood that various changes and variations may be made, all without departing from the spirit and scope of this invention.

What is claimed is:

1. A multi-component, collapsible cabin comprising:
   (a) a rectangular central section having a floor panel; a lower wall portion secured to each end thereof, an upper wall portion hinged to each lower wall portion, normally upstanding therefrom but adapted to fold inwardly and over the floor, and an outwardly disposed slide channel means across each lower wall portion;
   (b) a pair of opposing side sections, each having a width approximating one-half the width of the central section, each having a lower side wall portion and a lower end wall portion at each end thereof, an upper side wall hinged to the lower side wall portion normally upstanding therefrom but adapted to fold inwardly and over the floor, and an upper end wall hinged to each lower end wall portion and normally upstanding therefrom but adapted to fold inwardly over the floor, said lower end wall portions of each side section embracing the lower wall portion of the central section and being carried in said slide channel means whereby to permit the side sections to be shifted laterally from a normally open position with each side section extended outwardly from the central section to a retracted position with the side section overlapping the central section, and a side roof panel section normally overlying each side section but adapted to be removed when the side section and the walls thereof are to be retracted;
   (c) a floor extension extending from each side of the central section floor when the side sections are extended;
   (d) a central roof panel section overlying the walls of the central section and the inward edges of the side roof sections when the latter are mounted upon the side sections; and
   (e) means at the edges of each section lap-contacting abutting edges of the adjacent sections.

2. A collapsible cabin, as set forth in claim 1, wherein said lapping means include:
   flanges extending upwardly from the inward edges of said side roof panels;
   depending flanges on the side edges of said center roof panel engaging said upstanding flanges when said cabin is assembled; and lateral flanges depending from said center roof panel but spaced inwardly from the ends thereof engaging the top edge of said upper wall portions of said center section.

3. In the collapsible cabin set forth in claim 1 wherein the hinging points of the several upper wall portions are offset with:
   (a) one of the wall portions of said central section being hinged above the other;
   (b) the end wall portions of the side sections being hinged above the wall portions of the central section, and with one end wall portion at one end of each side section being hinged above the other end wall portion at the opposite end of each side section; and
   (c) the side wall portions of the side sections being hinged above the end wall portions of the side sections with one side wall portion of one side wall section being hinged above the other side wall portion of the other side section, and wherein the sequential spacings of the hinges, one above the other, are at least equal to the thickness of said walls so that the walls will fold flat when the cabin is collapsed.

4. In the collapsible cabin as set forth in claim 1, wherein the side floor panels are hingedly connected to the center floor section to normally outstand from each side thereof but to fold over the central section when retracted.

5. A collapsible cabin, as set forth in claim 4, wherein said front and rear side walls of said side sections extend forwardly and rearwardly of said front and rear walls of said center section respectively and said foldable floor sections are provided with hinged flaps at both ends of both sections adapted to fill the space between said front and rear side walls and said side floor panels.

6. A collapsible cabin, as set forth in claim 4, wherein said floor sections include:
   a first flap hinged at the bottom front and rear edge of each said side floor panel; and
   a second flap hinged at the opposite top edge of each of said first flaps, said first and second flaps adapted to be pivoted so as to fold said side floor panels between a collapsed position on top of said center floor panel and an assembled position in which said side floor panels lie in the same plane as said center floor panel.

7. A collapsible cabin, as set forth in claim 1, wherein said center section floor panel includes laterally disposed, spaced guide members attached to the bottom thereof and having outwardly extending flanges; and
   said side sections include channels having rollers which roll upon said flanges for moving said side sections between open to closed positions.

8. A collapsible cabin, as set forth in claim 7, wherein said members include:
   a pair of centers members;
   a pair of long center rails on each of said side sections, said center rails of one of said side sections adapted to ride on opposite flanges of said center members from the center rails of said other side section and cross on opposite sides of said center members when said cabin is closed;
   a pair of outer members; and
   a pair of short outer rails on each of said side sections, the outer members of said side section adapted to ride on the same flange as said outer members of said other side section.

9. A collapsible cabin, as set forth in claim 1, wherein:
   said end walls of the side section and the respective walls at the ends of the central section are provided with interlocking means, so that when said cabin is assembled, the walls are interlocked; and
   said interlocking means include lapping flanges.

10. A collapsible cabin, as set forth in claim 1, including depending rollers extending from one end and from each side of said center roof panel and adapted to roll along said side roof panels during assembly and to extend beyond said cabin when assembled, so that said central roof panel will drop to a position overlying each end wall of the central section when said central roof panel is pushed into position over the cabin, as from one end of the cabin.

11. A collapsible cabin, as set forth in claim 10, wherein said rollers are spaced outwardly from one end of said central roof panel a distance substantially equal to the width of said front or rear wall.

12. A collapsible cabin, as set forth in claim 11, further including:
   a member extending from each side of said one end of said center roof panel, said rollers being mounted at the outer end thereof;
   means pivotally attaching the other end of each said members to said center roof panel; and
   stop means on each side edge of said center roof panel outwardly of said pivot means adapted to be engaged by said member to hold said rollers in extended position.

13. A collapsible cabin including:
   a rectangular central section having front, rear and opposed side edges;
   a front wall hinged along said front edge adjacent the bottom of said central section;
   a rear wall hinged to said central section along said rear edge spaced vertically above the hinge of said front wall a distance at least equal to the thickness of said front wall;
   a center floor panel covering in said center section;
   a plurality of spaced elongated members attached transversely to the bottom of said center floor panel and having substantially horizontal outwardly extending flanges spaced from said bottom;
   a pair of side sections having means to slide between a closed position integrated with said central section and an open position juxtaposed to said central section;
   a plurality of spaced transverse rails on each said side section, each said rail having rollers adapted to roll along the flanges of said members for opening and closing said cabin;
   a pair of side floor panels hinged to opposite side edges of said center floor panel, each having a width approximately one-half the width of said center floor panel and adapted to be pivoted from a closed position on top of said center floor section to an open position resting on said rails in said side sections, respectively;
   a front side wall hinged adjacent the bottom of each said side assembly but at a point spaced vertically above the hinge of said rear wall of said center section a distance at least equal to the thickness of said rear wall;
   a rear side wall hinged to each side assembly at a point spaced vertically above the hinge of said front side wall a distance at least equal to the thickness of said front side wall;
   a first side wall hinged along the side edge of one of said side sections at a point spaced vertically above the hinge of said rear side wall a distance at least equal to the thickness of said rear side wall;
   a second side wall hinged along the side edge of the other of said side sections at a point spaced vertically above the hinge of said first side wall a distance at least equal to the thickness of said first side wall;
   means for interlocking said respective panels when said panels are in erected position;
   side roof panels having means to engage and be supported by said side walls and said front and rear walls of said respective side sections in their erected position and each having an upwardly extending center flange;
   a center roof panel having depending side flanges and engaging said upstanding flanges of said side roof panels;

roller means extending from one end of said roof panel and adapted to roll along said side panels during assembly and to drop down over the ends of said side roof panels after assembly;

lateral flanges depending from said center roof panel and spaced inwardly from the ends thereof, engaging the inside upper edges of said front and rear panels, respectively, when said rollers drop off the ends of said side roof panels;

pivotal mounting means attaching said rollers to said center roof panel for pivoting said rollers from an extended position beyond the end of said center roof panel and closed inwardly extending position; and stop means for limiting the pivotal movement of said rollers in extended position.

References Cited by the Examiner

UNITED STATES PATENTS

| 2,006,477 | 7/1935 | Pendry | 296—23.7 |
| 2,606,057 | 8/1952 | Johnson | 52—67 |
| 2,813,747 | 11/1957 | Rice | 52—67 |
| 2,883,713 | 4/1959 | Zug | 52—67 |
| 2,963,122 | 12/1960 | Jagemann | 52—70 |
| 3,118,552 | 1/1964 | Behr | 214—500 |

FOREIGN PATENTS

| 457,169 | 1938 | Great Britain. |
| 493,964 | 1938 | Great Britain. |

FRANK L. ABBOTT, *Primary Examiner.*

R. A. STENZEL, *Assistant Examiner.*